United States Patent [19]

Raasch

[11] Patent Number: 5,035,571

[45] Date of Patent: Jul. 30, 1991

[54] ASSEMBLY FOR PALLETIZING CROSS-WOUND BOBBINS

[75] Inventor: Hans Raasch, Monchen-Gladbach, Fed. Rep. of Germany

[73] Assignee: W. Schlafhorst AG & Co., Mönchengladbach, Fed. Rep. of Germany

[21] Appl. No.: 348,987

[22] Filed: May 8, 1989

Related U.S. Application Data

[63] Continuation-in-part of Ser. No. 186,375, Apr. 26, 1988, abandoned.

[30] Foreign Application Priority Data

Apr. 28, 1987 [DE] Fed. Rep. of Germany ....... 3714057

[51] Int. Cl.⁵ .............................................. B65G 57/20
[52] U.S. Cl. ............................. 414/789.5; 414/744.3; 414/744.4; 414/791.6; 414/792.9; 414/793; 414/794.4; 414/927
[58] Field of Search ....................... 198/408, 412, 413; 414/789.5, 791.6, 793, 792.9, 794.4, 927, 786, 794.5, 744.3, 744.4, 744.8

[56] References Cited

U.S. PATENT DOCUMENTS

| | | | |
|---|---|---|---|
| 3,921,825 | 11/1975 | Sheehan | 414/789.5 |
| 3,951,272 | 4/1976 | Sankovich | 414/744.8 X |
| 4,015,732 | 4/1977 | Beaty, Jr. et al. | 414/792 |
| 4,226,567 | 10/1980 | Van Orsdale, Jr. | 414/744.3 X |
| 4,729,709 | 3/1988 | Raasch | 414/399 |
| 4,773,810 | 9/1988 | Nishimura et al. | 414/792.9 X |

Primary Examiner—Robert J. Spar
Assistant Examiner—Janice Krizek
Attorney, Agent, or Firm—Herbert L. Lerner; Laurence A. Greenberg

[57] ABSTRACT

In an apparatus for setting down cross-wound bobbins into a transport container, preferably onto a pallet, cross-wound bobbins are received at a transfer position with a programmable apparatus, such as a programmable palletizing apparatus. A plurality of the cross-wound bobbins are simultaneously delivered in succession in a plurality of increments from the transfer position onto a pallet or into a transport container at a drop-off location with the programmable apparatus.

10 Claims, 3 Drawing Sheets

ASSEMBLY FOR PALLETIZING CROSS-WOUND BOBBINS

CROSS REFERENCE TO RELATED APPLICATIONS:

This application is a continuation-in-part of application Ser. No. 186,375, filed Apr. 26, 1988, now abandoned.

The invention relates to a method for setting down cross-wound bobbins, or cheeses, in which the cheeses are picked up from a bobbin producing machine and are set down in a predetermined distribution pattern.

Yarn or thread is not always processed into flat textile goods at the same place where yarns are made and wound onto bobbins. In other words, cross-wound bobbins or cheeses which are produced on a bobbin producing machine must, for instance, be assembled into batches for shipping.

It is even possible at present to set down bobbins automatically in relatively large packages in a transport container during the course of automation. German Published, Non-Prosecuted Application DE-OS No. 34 41 778, corresponding to U.S. Pat. No. 4,729,709, discloses an apparatus with which a plurality of finished bobbins that are ready at a bobbin producing machine can be grasped automatically and set down into a transport container. The setting down takes place automatically in accordance with a specified distribution pattern. However, since the tubes in the bobbins are horizontal when the bobbins are set down, and a very compact packing of bobbins in the container is attained, it is either completely impossible or only possible with very great difficulty to unload the bobbins with automatic manipulators.

It is accordingly an object of the invention to provide a method and apparatus for palletizing cross-wound bobbins, which overcome the hereinafore-mentioned disadvantages of the heretofore-known methods and devices of this general type and with which cross-wound bobbins or cheeses made on a bobbin producing machine are automatically set down in such a way that the bobbins are always assembled by automatic manipulators into a larger bundle for transport and further handling, regardless of their diameter and height.

With the foregoing and other objects in view there is provided, in accordance with the invention, a method for setting down cross-wound bobbins into a transport container, such as a pallet, which comprises receiving cross-wound bobbins at a transfer position with a programmable apparatus, such as a programmable palletizing apparatus, and simultaneously delivering a plurality of the cross-wound bobbins in succession in a plurality of increments from the transfer position into the transport container or pallet at a drop-off location with the programmable apparatus or palletizing apparatus.

With the objects of the invention in view, there is also provided an assembly for palletizing cross-wound bobbins on a pallet, comprising a palletizing apparatus, a transport belt connected to the palletizing apparatus and having a beginning and an end, a delivery apparatus being firmly associated with the beginning of the transport belt, and a gripping and lifting apparatus being firmly associated with the end of the transport belt for picking up linearly furnished bobbins from the transport belt and lowering the bobbins on a pallet at a drop-off position.

The method of the invention provides for delivering a plurality of cross-wound bobbins simultaneously, but in succession, in a plurality of increments, from the transfer position at the bobbin producing machine to the drop-off position on a pallet, and for simultaneously picking up a new bobbin when a bobbin is set down on the pallet. The delivery of the bobbins from the transfer position to the drop-off position is controlled in a plurality of increments by a control apparatus, and the setting down of the bobbins on the pallet is carried out automatically by the control means in accordance with the particular bobbin type and therefore in accordance with the distribution pattern associated with the particular bobbin producing machine.

This advantageously ensures that a plurality of bobbins are always simultaneously on the way from the transfer position to the drop-off position. At the same time, as one bobbin is set down onto the pallet, another bobbin in a pickup position is received, and still another bobbin is transferred from the bobbin producing machine to the palletizing apparatus. Manipulation of the bobbins takes place automatically, without human intervention. Setting bobbins down on the pallet is carried out in accordance with a distribution pattern which is matched to the particular bobbin type, so as to provide the most compact packing possible, in a position that is the most favorable for transport and further manipulation by automatic manipulators.

In the palletizing method according to the invention, the bobbins only travel short distances during each operating cycle, so that the cycling times are short.

In accordance with another feature of the invention, the delivery apparatus has a discharging point, and there are provided means pivotably and longitudinally connecting the transport belt with the palletizing apparatus for maintaining the transport belt below the discharging point regardless of the position of the gripping and lifting apparatus.

In accordance with a further feature of the invention, the transport belt has a guide, the palletizing apparatus has a frame, and there is provided a swivel joint connecting the guide to the gripping and lifting apparatus, and a rotary slide joint joining the guide to the frame of the palletizing apparatus.

In accordance with an added feature of the invention, the gripping and lifting apparatus has at least two grippers pivotable about a vertical shaft.

In accordance with an additional feature of the invention, there is provided a lifting rod for raising and lowering the grippers on the vertical shaft.

In accordance with yet another feature of the invention, there are provided two carriages disposed at right angles to one another for moving the gripping and lifting apparatus in a horizontal plane.

In accordance with yet a further feature of the invention, the delivery apparatus is in the form of a linear transport apparatus having transfer forks at a transfer position for delivering the bobbins to the delivery apparatus.

In accordance with yet an added feature of the invention, the palletizing apparatus has grippers for receiving and setting down divider layers.

In accordance with yet an additional feature of the invention, the palletizing apparatus has a lifting apparatus with a plurality of divider layers.

In accordance with still another feature of the invention, there are provided means for supporting the plurality of divider layers to be raised and lowered by the lifting apparatus.

In accordance with still a further feature of the invention, the palletizing apparatus has grippers for grasping, raising and lowering the pallets.

In accordance with a concomitant feature of the invention, the grippers have guide contours for positioning the pallets.

The method according to the invention is performed with a palletizing apparatus that has a conveyor belt which is movable in two coordinates in a horizontal plane. A transfer apparatus is firmly associated with the beginning of the conveyor belt and a gripping and lifting apparatus that can be displaced longitudinally and transversely is firmly associated with the end of the conveyor belt. The delivery apparatus delivers the bobbins from the transfer position on the bobbin producing machine to the conveyor belt, which is pivotably connected to the gripping and lifting apparatus.

One end of the conveyor belt always follows the gripping and lifting apparatus, while at the other end the belt is supported on a joint in such a way that it is always located beneath the delivery apparatus. The gripping and lifting apparatus is always located above the pallet. Through the use of the two opposed grippers, which can be rotated in increments of 180° about a common shaft, it is advantageously possible to simultaneously pick up a bobbin in a pickup position and to set down a bobbin in a drop-off position. To this end, the grippers are disposed on the gripping and lifting apparatus in such a way that they are both rotatable and raisable and lowerable.

In order to be able to set down the bobbins in the specified distribution pattern, the gripping and lifting apparatus is secured on a longitudinally movable carriage. This carriage in turn is suspended in a transversely movable carriage which moves in two linear guides that are supported by the frame of the palletizing apparatus. The apparatus is thus similar to a bridge crane having a trolley. It is therefore advantageous for the gripping and lifting apparatus to be simultaneously longitudinally and transversely movable in a horizontal plane, in such a way that every point on the pallet can be reached. The lifting, gripping and transporting apparatus of the palletizing apparatus are controlled centrally through a control means. This means may, for instance, be equipped with a program register for the various distribution patterns, operating as a function of the bobbin diameter. At the same time, the control means can be equipped with a program for coordinating the function sequences of the palletizing apparatus during the palletizing operation. The palletizing apparatus can also advantageously be equipped with a multicontact, with which it can communicate with the computer of the bobbin producing machine, or with a central computer, and exchange signals and data.

The palletizing apparatus may also have its own drive means, causing it to automatically move to a bobbin producing machine and to automatically position itself in front of the end of the transport belt from which the bobbins are to be removed, when requested by the bobbin producing machine. The positioning can be facilitated by a positioning apparatus which may, for instance, be formed of an optoelectronic sensor that responds to a reflection marking on the bobbin producing machine.

The bobbin producing machine is advantageously equipped in such a way that it either brings a pallet onto which the bobbins are set from a storage location, or it automatically hoists a pallet which is already at the bobbin producing machine and positions it at the correct height for setting down the bobbins.

At the same time it is possible to cover every other layer of bobbins with an intermediate or divider layer, in order to protect the bobbins. The advantage of this palletizing apparatus is that all of the processes, from the request for the palletizing apparatus, to its positioning in front of the bobbin producing machine, and the pickup of the pallet to the setting down of the completely loaded pallet at a storage location, can take place without human intervention. Moreover, the bobbins are set down in such a position that they are accessible to an automatic manipulator again at any time.

Other features which are considered as characteristic for the invention are set forth in the appended claims.

Although the invention is illustrated and described herein as embodied in a method and assembly for palletizing cross-wound bobbins, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1a is a portion of FIG. 1 showing control means;

Figure 1:
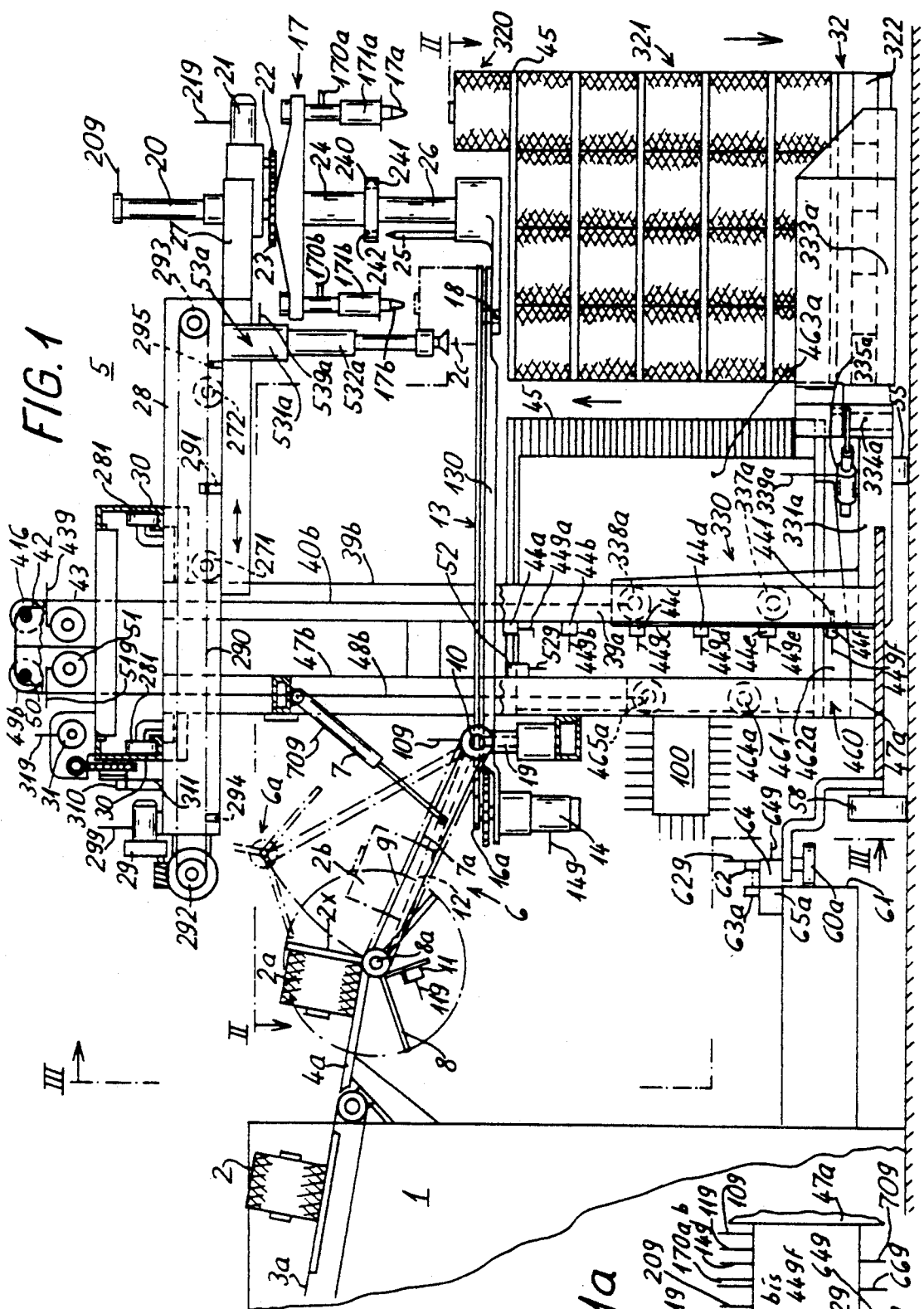
FIG. 1 is a fragmentary, diagrammatic, partly sectional side-elevational view taken along the line I—I of FIG. 3, in the direction of the arrows.
Figure 2:
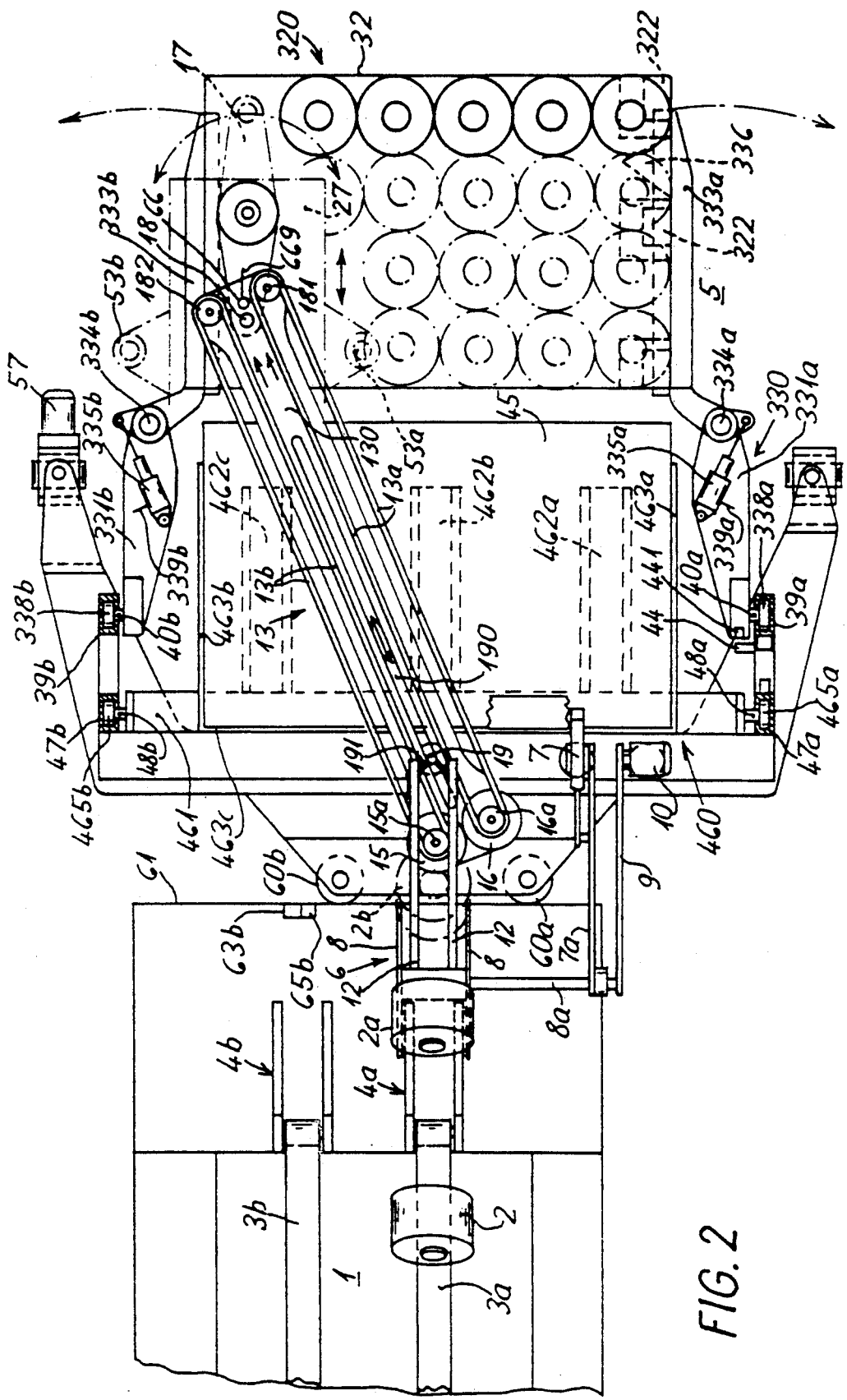
FIG. 2 is a fragmentary, partly sectional top-plan view taken along the line II—II of FIG. 1, in the direction of the arrows.
Figure 3:
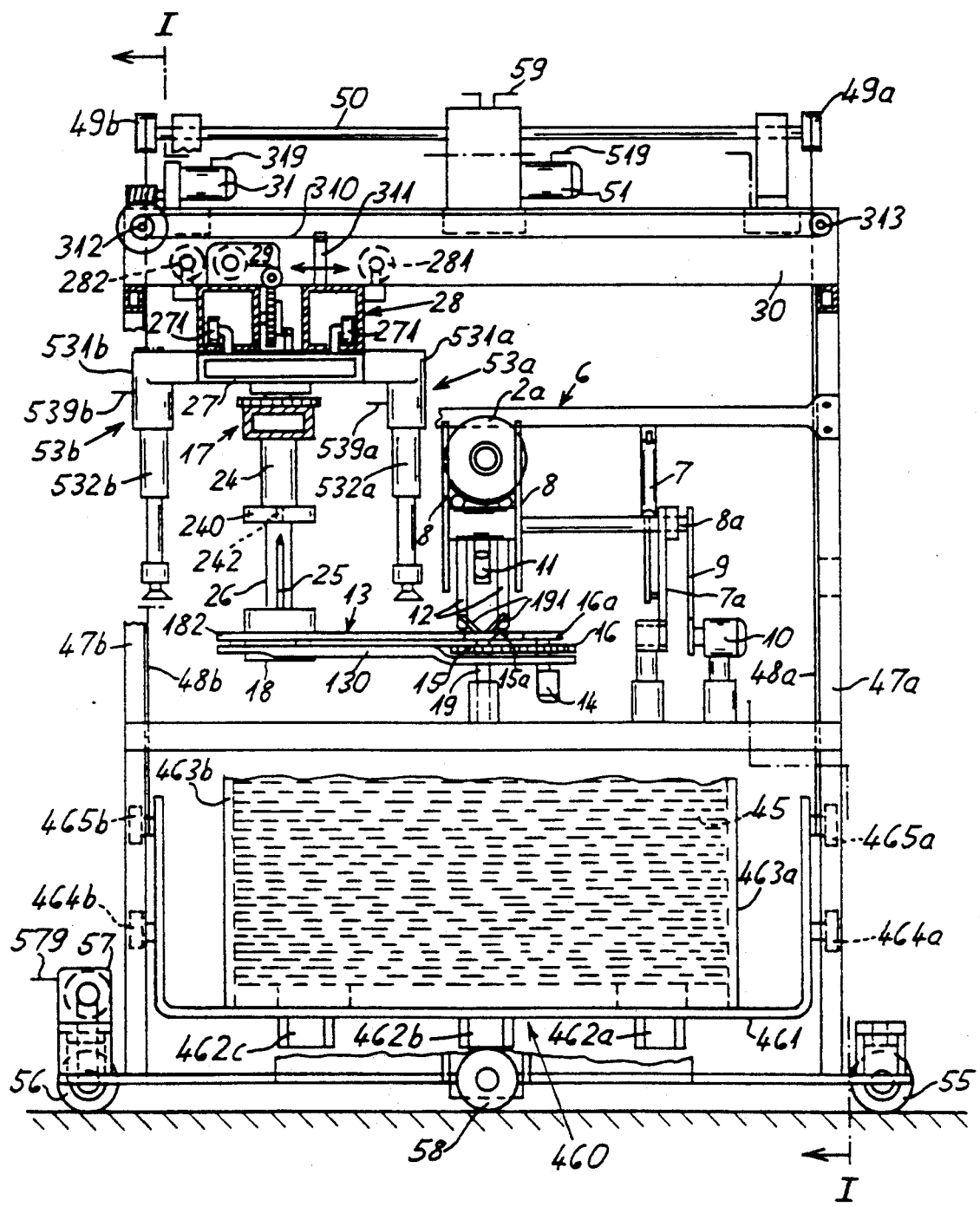
FIG. 3 is a partly sectional rear-elevational view taken along the line III—III of FIG. 1, in the direction of the arrows.

Referring now more specifically to FIGS. 1-3 as a whole, there is seen a bobbin producing machine 1 which is not illustrated in detail, such as an automatic cross-wound bobbin or cheese machine or an open-end rotor spinning machine which is equipped with two transport belts 3a and 3b, as shown in FIG. 2, and from which cross-wound bobbins or cheeses 2 are delivered at the end of the machine by the transport belt 3a. The bobbins 2 are transferred from the transport belt 3a to a gravity-roller conveyor or chute 4a. The chute 4a is formed of two parallel bars, so that the bobbins are centrally guided thereon.

A movable palletizing apparatus 5 according to the invention has positioned itself in front of the transport belt 3a of the bobbin producing machine 1 in such a way that a delivery apparatus 6 faces the chute 4a. A compressed air cylinder 7 can raise the delivery apparatus through a swivel lever 7a, from a transport position 6a shown in phantom into a transfer position. The delivery apparatus 6 has a transfer apparatus that is formed of rotatable transfer forks 8 on the end thereof facing toward the bobbin producing machine 1. As FIG. 2 shows, the transfer forks 8 rotate laterally past the chute 4a. Three transfer forks 8 which are disposed on each side, are mutually spaced apart by 120°. The transfer forks 8 are connected to a shaft 8a, which is in turn connected by a toothed belt drive 9 to an electric motor 10. The electric motor 10 rotates each the forks through 120°, so that one pair of forks is always perpendicular to the chute 4a.

An optical sensor 11 is secured to the delivery apparatus 6. The optical sensor emits a signal to control means 100 through a signal line 119 whenever a bobbin 2a is resting against the vertically positioned fork 8, whereupon the motor 10 is switched on through a signal line 109. After a 120° rotation of the forks 8, the bobbin 2a is set down into a position 2b with the side thereof on a linear conveyor, which in the present case is a chute 12. The chute 12 is formed of two polished bars, between which a tube end 2x extending from the bobbin protrudes, so that the bobbin is guided. The bobbin slides downward to the end of the chute 12, where the bars 12 are firmly joined through a Y-shaped fork 191 to the pivot pin of a rotary slide joint 19, as seen in FIG. 3. In this case the bobbin reaches a conveyer belt 13. The conveyor belt is formed of two parallel belts 13a and 13b. The belts are driven by a motor 14 through meshing gear wheels 15 and 16 and drive rollers 15a and 16a in such a way that the inner strands or runs are synchronized. The bobbin which is resting on the belt is carried away from the chute 12 to the pickup point at the end of the conveyor belt 13 where it assumes a position 2c. The outer strands of the belts 13a and 13b are guided in such a way that they are located somewhat lower than the inner strands, so that they do not touch the side of the bobbin.

A supporter 130 of the conveyor belt 13 is connected through a swivel joint 18 to a gripping and lifting apparatus 17 for palletizing the bobbins. The swivel or rotary joint 18 is located precisely under the pickup point of the bobbins, between respective deflecting rollers 181 and 182 of the belts 13a and 13b. The gripping and lifting apparatus 17 is suspended from a movable longitudinal carriage 27, which in turn is suspended on a transverse carriage 28 movable at right angles thereto. The carriages are movably disposed in the frame of the palletizing apparatus. On the other end, the supporter 130 of the conveyor belt 13 rests on the stationary rotary slide joint 19, which is connected to the palletizing apparatus frame, as shown in FIG. 2. By coupling the chute 12 to the rotary slide joint 19, the transfer point of the chute is always located precisely above this joint. Due to the rotary slide joint 19, the inner strands of the belts 13a and 13b are always located precisely below the discharge point of the chute 12, at the most varied drop-off positions of the gripping apparatus 17. In order to ensure that the supporter 130 of the conveyor belt 13 can move back and forth in the direction of the arrows opposite the stationary rotary slide joint 19, the supporter has a guide slit 190 formed centrally between the belts 13a and 13b, in which the rotary slide joint 19 is guided.

The gripping apparatus 17 has two opposed grippers 17a and 17b, which operate in the same manner to engage the inside of the tubes of the bobbins and hold them from the inside. The grippers 17a and 17b are axially displaceable and have resilient compensation elements 171a and 171b in the form of shock absorbers, in order to compensate for the different height of the pickup point and drop-off point. The grippers are actuated by means of compressed air, the supply of which through connections 170a and 170b is controlled by the control means 100. The construction and operation of pneumatic grippers for upending bobbins is prior art and is known, for instance, from U.S. Pat. No. 3,835,633. The gripping and lifting apparatus 17 is controlled by the control means 100. The gripping and lifting apparatus 17 has a motor 21 with a pinion 22 which engages a toothed ring 23 and rotates the grippers 17a and 17b in increments of 180°. The incremental rotation is controlled through a signal line 219. After each 180° rotation, the gripping apparatus 17 is lowered by a compressed air cylinder 20. A lifting rod 24 is connected to a piston of the cylinder 20. In order to ensure that the gripping apparatus can be positioned precisely, it is centered by a respective one of two opposed bores 241 and 242 in a collar 240 on the lifting rod 24. When the gripping and lifting apparatus 17 is lowered, a centering pin 25 enters into the opening located directly above it, as a result of which the grippers 17a and 17b are precisely positioned.

The gripping and lifting apparatus 17 rotates about a shaft 26 that is secured on the longitudinal carriage 27. The carriage is linearly displaceably supported in the transverse carriage 28 by two pairs of rollers 271 and 272. The longitudinal carriage 27 is moved back and forth in the longitudinal direction of the palletizing apparatus by a motor 29 operating through a chain 290. The chain 290 is connected to the longitudinal carriage 27 at a point 291. The chain travels from a drive sprocket wheel 292 over a deflecting wheel 293 and can then move the longitudinal carriage 27 back and forth in the direction of the arrow between extreme positions, from a reversal point 294 to a reversal point 295. Instead of a chain drive, it is also possible to use a hydraulic or pneumatic cylinder as a drive mechanism. The transverse carriage 28 supports the longitudinal carriage 27 and is movable at right angles thereto. Two roller pairs 281 and 282 suspend the carriage 28 in a linear guide 30 of the apparatus frame, which is formed of two profiled irons that are mutually parallel and alongside one another, as can be seen in FIGS. 1 and 3. The carriage 28 is driven by a motor 31, again through a chain 310. A connection 311 exists between the chain 310 and the carriage 28. The chain 310 travels over a sprocket wheel 312 and a deflecting roller 313. Once again, it would be possible to use a hydraulic or pneumatic cylinder mounted on the apparatus frame having a piston rod which engages the carriage, as a drive mechanism.

The motors 29 and 31 are controlled by the control means 100 through respective signal lines 299 and 319, in such a way that a gripper setting the bobbin down assumes the correct drop-off position in accordance with a specified distribution pattern.

The bobbins set down onto the conveyor belt 13 by the delivery apparatus 6 are transported to the position 2c at the pickup point. In each case, individual bobbins are transported. At the pickup point, the bobbins are lifted from the conveyor belt by a gripper of the gripping and lifting apparatus 17 and set down onto a pallet 32 after one rotation of the gripping and lifting apparatus through 180°. In each case, the bobbins are set down in a row 320, and a plurality of rows in succession form a layer 321. At the beginning of the bobbin setting-down operation, the empty pallet 32 is in its highest position, directly below the gripping and lifting apparatus 17.

The gripping and lifting apparatus 17 transports the bobbins in a horizontal plane. Once a layer 321 of bobbins has been distributed, the pallet must be lowered by one bobbin height, so that the next layer can be set thereon. To this end, the palletizing apparatus 5 is equipped with a lifting mechanism 330 having two pallet grippers 333a and 333b. The palletizing apparatus can either receive a pallet from a central storage location and carry it along to the loading location, or the pallet can be prepared at a predetermined location at the bobbin producing machine. FIG. 2 shows the lifting mechanism 330 with the pallet grippers 333a and 333b. The pallet grippers are pivotable through 90° by compressed air cylinders 335a and 335b about pivot points 334a and 334b, so that they are at right angles to the palletizing apparatus. In the upwardly pivoted state of the pallet grippers, the palletizing apparatus can move in between a ready or set-down pallet and a bobbin producing machine. The control means 100 control the opening and closing of the pallet grippers by the compressed air cylinders 335a and 335b, through respective signal lines 339a and 339b. By pivoting the pallet grippers 333a and 333b inward, the pallet 32 is already precisely positioned in one direction. In order to position it precisely in the other direction as well, the pallet grippers 333a and 333b have guide contours 336, which grip inbetween the spacer blocks 322 of the pallet 32 and thus center it. Spacer blocks 322 have standardized dimensions, resulting in uniform spacing dimensions for the blocks. However, the pallet grippers may also have guide contours that center the pallets on the outside. The pallet grippers 333a and 333b are articulated on guide holders 331a and 331b. The guide holders 331a, 331b are guided with rollers 337a and 338a, and 337b and 338b, in respective vertical rails 39a and 39b. They can each be raised with cables 40a and 40b, which are secured on the shafts of the rollers 338a and 338b. The cables 40a and 40b are wound onto drums 41a and 41b. The drums 41a and 41b are seated on a shaft 42, which is rotated by a motor 43. Switches 44a-44f shown in FIG. 1 are mounted on the rail 39a and communicate through signal lines 449a-449f with the control means 100. The switches are actuated through an actuator 441 secured to the guide holder 331a. The control means accordingly switch the motor 43 on or off through a signal line 439 and position the pallet at the height required at that time.

Once a layer of bobbins has been distributed and the pallet has been lowered by one bobbin height, a divider layer 45 is placed on the bobbins by two suction grippers 53a and 53b on the longitudinal carriage 27, in order to protect the yarn packages. A supply of divider layers is stacked on a second lifting mechanism 460 in the palletizing apparatus. The lifting mechanism 460 for the divider layers 45 is formed of a U-shaped guide holder 461 with three fork-like support prongs 462a, 462b and 462c, on which the divider layers rest. Side walls 463a and 463b and a rear wall 463c support the divider layers laterally.

The lifting mechanism 460 is also vertically guided in the frame of the palletizing apparatus, with rollers 464a, 465a and 464b, 465b. The rollers run in rails 47a and 47b. The lifting mechanism is raised with cables 48a and 48b, which are secured on the shafts of the rollers 465a and 465b. The cables are wound on drums 49a and 49b. The drums are seated on a shaft 50, which is driven by a motor 51. A sensor 52 records the presence of the uppermost divider layer at a given time. If a divider layer is raised, this is reported to the control means 100 through a signal line 529. The control means thereupon switch on the motor 51 through a signal line 519, and the motor lifts the lifting mechanism 460 far enough so that the uppermost divider layer is always at the same height.

The two suction grippers 53a and 53b are each moved into three different positions by two compressed air cylinders connected in line with one another. Compressed air cylinders 531a and 532a are provided for the suction gripper 53a and compressed air cylinders 531b and 532b are provided for the suction gripper 53b. A synchronous control of the particular cylinder is effected by the control means 100, with which the suction grippers 53a and 53b are connected through respective signal lines 539a and 539b. The movement to the uppermost position of the suction grippers is necessary so that the conveyor belt 13 can pivot through and between the suction grippers. The pickup and setting down of a divider layer takes place in the lowermost position. In the middle position, the transport of a divider layer lifted from the stack by the suction grippers to the pallet takes place.

The palletizing apparatus 5 has a chassis having two steerable wheels 55 and 56, at least one of these wheels being controllable by drive means 57 through a signal line 579. A third, rigid roller 58 supports the frame of the palletizing apparatus in the middle of the opposite side. The chassis can be controlled by means of rails or by means of an inductively sensed guide, which are not illustrated in the drawings. Power is supplied, for example, through a loop line 59, which may be on crane tracks, or by batteries.

The side of the palletizing apparatus 5 facing toward the bobbin producing machine 1 has two horizontally disposed rollers 60a and 60b, which move along a guide contour 61 secured to the machine or to the floor. As a result, the palletizing apparatus can be positioned exactly. A further aid in positioning is provided by a positioning apparatus including a sensor 62, which is disposed centrally below the delivery apparatus 6. The sensor 62 may, for instance, be an optoelectronic sensor, which responds to reflectors 63a and 63b, respectively, which are located below the transport belts 3a and 3b of the bobbin producing machine 1 on the guide contour 61. If the palletizing apparatus is moved along the rear of the machine, the sensor 62 emits a signal through a signal line 629 to the control means 100 whenever it is facing a reflector 63a or 63b. The drive mechanism 57 of the wheel 56 is then stopped through the signal line 579.

The control means 100 of the apparatus according to the invention has a program register for various distribution patterns in accordance with the bobbin diameter. As a rule, a bobbin producing machine furnishes bobbins all having the same diameter. However, the bobbin diameter can differ from one machine to another. The machines therefore have a code that the palletizing apparatus can read, so that the control means can assign the appropriate distribution program. In order to be able to read the code and to match the distribution program to the bobbin producing machine, the machine also has respective multicontacts 65a and 65b at the point where the reflectors 63a and 63b are located. The multicontact is connected to the machine computer or a central computer system and can come into contact with an identical type of multicontact 64 on the palletizing apparatus during a positioning operation. The multicontact 64 is connected through a signal line 649 to the control means 100, so that the control means can exchange signals with the computer of the machine or with the central computer. However, the exchange of signals can also take place in a contactless manner by radio.

However, the control of the distribution program of the bobbins can also be configured in such a way that a guide computer monitors the individual bobbin producing machines and the palletizing apparatus and thus assigns the correct distribution program in each case.

Palletizing of a pallet takes the following course:

Once all of the bobbins on the bobbin producing machine 1, or a certain fraction of them, for example the number required for three layers of bobbins, are furnished on the transport belt 3a, the palletizing apparatus 5 is called by the bobbin producing machine. This can be done, for instance, through the multicontact 64, when the palletizing apparatus is in a parked position, or through radio signals. The palletizing apparatus 5 moves to the machine making the request, e.g. the bobbin producing machine 1, and positions itself in front of the transport belt 3a with the aid of the sensor 62. At the same time the multicontact 64 of the palletizing apparatus comes into contact with the multicontact 65a on the machine. The palletizing apparatus has either taken a pallet 32 from a storage location, or the pallet is ready in front of the machine.

The program that has then elapsed is fed to the control means 100, which may be equipped with a programmable memory. The individual control commands are issued to the motors and to the control valves of the pneumatic and hydraulic cylinders through the various control lines.

The pallet 32 is held by the pallet grippers 333a and 333b and is raised to the uppermost position with the aid of the lifting mechanism 330, where the motor 43 is switched off through the switch 44a. In the linear guide 30, the transverse carriage 28 moves the longitudinal carriage 27 into the middle of the palletizing apparatus. The control is effected in accordance with the distribution pattern associated with the bobbin producing machine, this pattern being called up through the multicontact 64 and reported to the control means 100 over the signal line 649. The longitudinal carriage 27 moves its suction grippers 53a and 53b over the stack of divider layers 45 and lowers them by means of the compressed air cylinders 531 and 532. A divider layer 45 is lifted, and the carriage 27 moves it to a location above the pallet 32, onto which it is laid down. The transverse carriage 28 and the longitudinal carriage 27 then move the gripping and lifting apparatus 17, under the control of the control means 100, into the first drop-off position.

In the meantime the delivery apparatus 6 has been pivoted from the phantom transport position 6a downward to a position in front of the chute 4a of the bobbin producing machine 1 by the compressed air cylinder 7, as a result of a signal form the control means 100 through the signal line 709. After the first divider layer 45 has been placed on the pallet 32, a signal is given to the bobbin producing machine 1 by the signal means 100 through the multicontact 64 and the multicontact 65a, whereupon the transport belt 3a starts up, until a bobbin 2a at the end of the chute 4a rests on a pair of forks 8. The transport belt 3a then stops, because the optical sensor 11 has recognized the bobbin in the position 2a and has reported this to the control means 100 through the signal line 119. The control means sets the motor 10 of the delivery apparatus 6 into motion through the signal line 109. The transfer forks 8 each pivot through 180°, so that the bobbin rests with its side on the chute 12 and slides down onto the conveyor belt 13. At the same time, the motor 14 for the drive of the conveyor belt 13 is switched on through the signal line 149. Since the sensor 11 no longer recognizes a bobbin, the transport belt 3a starts up again, until the next bobbin rests on one of the transfer forks 8.

At the end of the chute 12, the bobbin is carried away by the belts 13a and 13b, until the tube end 2x protruding from the bobbin, meets a switch 66 shown in FIG. 2. For the sake of simplicity, the bobbins in the pickup position are not illustrated in FIGS. 2 and 3. The switch 66 sends a signal through the signal line 669 that the bobbin has arrived precisely beneath a gripper, in this case the gripper 17b, of the gripping and lifting apparatus 17. The drive motor 14 of the belts 13a and 13b is switched off through the signal line 149. The delivery apparatus 6 is switched on again and delivers the next bobbin to the conveyor belt 13. The compressed air cylinder 20 is made to lower the gripping and lifting apparatus 17 shown in FIG. 1, through the signal line 209. The gripper 17b clamps itself firmly in the tube of the bobbin 2c. Subsequently, the gripping and lifting apparatus is raised again. The motor 21 for rotating the gripping and lifting apparatus receives a signal through the signal line 219 to rotate the gripping and lifting apparatus 17 through 180° in the direction of the arrow drawn in solid lines. At the same time, the motor 14 of the conveyor belt 13 is switched on again, and the belts 13a and 13b start up and move the next bobbin into the pickup position. Once this further bobbin has arrived beneath the pickup position, it switches the motor 14 off again through the switch 66. At the same time the delivery apparatus 6 is switched back on again and places a new bobbin on the chute 12 and thus causes it to slide on to the conveyor belt 13. The compressed air cylinder 20 receives the signal to lower the gripping and lifting apparatus 17. With its second gripper 17a, the apparatus 17 grasps the bobbin that is ready and at the same time sets the bobbin down on the pallet with the first gripper 17b. Subsequently, the gripping and lifting apparatus is raised again and rotates again through 180°. In this process the transverse carriage 28 in its linear guide 30 moves to the next drop-off position.

By making reference to FIG. 2, it is seen that the process of setting down the bobbins began in the lower right corner, and the bobbins were set down in succession in a first row along the front edge of the pallet. Once one row of bobbins had been set down, the longitudinal carriage 27 moved to the next row. The gripping and lifting apparatus 17 must be rotated in the opposite direction to set down the bobbins in that row, as indicated by the phantom arrow, so that the bobbin suspended from the gripper will not collide with the bobbins already set down. Through the use of the method described above, one row of bobbins after another is set down until one complete layer has been put in place. Then the transverse carriage 28 moves into the middle of the linear guide 30, in order to lift a new divider layer 45 with the suction grippers 53a and 53b and set it down onto the layer of bobbins. The motor 43 of the lifting mechanism 330 for the pallet 32 is then switched on through the signal line 439, and the pallet is lowered by one bobbin height. Shutting off the motor 43 is effected by the switch 44b through the signal 449b. The removal of a divider layer 45 is recorded by the sensor 52 and reported by it through the signal line 529 to the control means 100. The motor 51 is subsequently switched on through the signal line 519, and the lifting mechanism 460 for the divider layers is raised far enough so that the sensor 52 stops the lifting process by shutting off the motor 51 when it records a divider layer.

Through the use of this method, one layer of bobbins is set down onto the next in rows, until all of the bobbins have been removed from the transport belt 3 or the pallet is filled. After a final divider layer is optionally placed on the bobbins, the lifting mechanism for the pallet sets the pallet down, or the palletizing apparatus sets it down at some central storage location. Before the palletizing apparatus moves away, the delivery apparatus 6 is raised, and the gripping and lifting apparatus 17 is moved into a position in which it does not protrude past the contours of the palletizing frame.

In the palletizing method according to the invention, the bobbins to be palletized are delivered in a plurality of steps from a stationary transfer position on a bobbin producing machine outside the pallet to a drop-off position on the pallet. A plurality of bobbins are simultaneously located on the way from the transfer position to the drop-off position. The bobbins are delivered by means of a delivery apparatus from the transfer position to a conveyor belt that is articulated on a gripping and lifting apparatus. The double-armed gripping and lifting apparatus picks up one bobbin from the end of the conveyor belt and at the same time sets down a previously picked-up bobbin onto the pallet. The gripping and lifting apparatus is moved in two coordinates at right angles to one another in accordance with the distribution pattern, which depends on the bobbin type. With one end, the conveyor belt follows the gripping and lifting apparatus, while at the other end it is supported on a joint in such a way that it is always located beneath the delivery apparatus. In this palletizing apparatus, one bobbin is located on the delivery apparatus, one at the beginning of the conveyor belt, a further one at the end of the conveyor belt, and one above the drop-off position at any given time. The bobbins travel only short distances per operating cycle, so that the cycling time is short.

The pallet is grasped by the grippers of a lifting mechanism, raised, and then after a complete layer of bobbins has been set down, it is lowered by the dimension of the bobbin height. The setting down of the bobbins therefore always takes place in the same horizontal plane, so that separate control devices for lifting and lowering the transport apparatus are not needed in this case. The stack of divider layers is always brought to the same pickup height with a second lifting mechanism. In a modification of the exemplary embodiment, the palletizing apparatus can also be mounted so as to be stationary on an individual bobbin producing machine.

I claim:

1. Assembly for palletizing cross-wound bobbins on a pallet, comprising a stationary delivery apparatus having a discharge location, and a palletizing apparatus including a frame, a transport belt having a supporter and being disposed downstream of the delivery apparatus, a transfer device in the form of a gripping and lifting apparatus disposed downstream of said transport belt, a swivel joint rigidly connecting said supporter to said gripping and lifting apparatus, and a rotary slide joint pivotably and longitudinally slidably connecting said supporter to said frame relative to the delivery apparatus for maintaining said transport belt below the discharge location regardless of the location of said gripping and lifting apparatus, said gripping and lifting apparatus having at least two grippers being pivotable about a vertical axis, means for lifting and lowering said grippers, and means for simultaneously operating said grippers to move one of said grippers to a position for receiving a cross-wound bobbin from said transport belt while moving another of said grippers to a position for dropping-off a cross-wound bobbin onto a pallet.

2. Assembly according to claim 1, including a lifting rod for raising and lowering said grippers on a vertical shaft.

3. Assembly according to claim 1, including two carriages disposed at right angles to one another for moving said gripping and lifting apparatus in a horizontal plane.

4. Assembly according to claim 1, wherein said delivery apparatus is in the form of a linear transport apparatus having transfer forks at a transfer position for delivering the bobbins to said discharge location.

5. Assembly according to claim 1, wherein said palletizing apparatus has grippers for receiving and setting down divider layers.

6. Assembly according to claim 5, wherein said palletizing apparatus has a lifting apparatus with a plurality of divider layers.

7. Assembly according to claim 6, including means for supporting said plurality of divider layers to be raised and lowered by said lifting apparatus.

8. Assembly according to claim 1, wherein said palletizing apparatus has pallet grippers for grasping, raising and lowering the pallets.

9. Assembly according to claim 8, wherein said pallet grippers have guide contours for positioning the pallets.

10. Assembly according to claim 1, wherein said grippers are first and second grippers, each movable to said receiving position and said drop-off position, said gripper operating means moving said first gripper to said receiving position while moving said second gripper to said drop-off position and moving said first gripper to said drop-off position while moving said second gripper to said receiving position.

* * * * *